United States Patent
Chhabra et al.

(10) Patent No.: US 9,351,253 B2
(45) Date of Patent: May 24, 2016

(54) ELECTRONIC DEVICE WITH LOW-POWER ROAMING

(71) Applicant: Apple Inc., Cupertino, CA (US)

(72) Inventors: Kapil Chhabra, Milpitas, CA (US); Veerendra M. Boodannavar, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 532 days.

(21) Appl. No.: 13/907,177

(22) Filed: May 31, 2013

(65) Prior Publication Data

US 2014/0254443 A1    Sep. 11, 2014

Related U.S. Application Data

(60) Provisional application No. 61/773,285, filed on Mar. 6, 2013.

(51) Int. Cl.
*H04W 4/26* (2009.01)
*H04W 48/20* (2009.01)
*H04W 52/02* (2009.01)

(52) U.S. Cl.
CPC ............ *H04W 52/0251* (2013.01); *H04W 4/26* (2013.01); *H04W 48/20* (2013.01); *H04W 52/0245* (2013.01)

(58) Field of Classification Search
CPC ................................ H04W 4/26; H04W 48/20
USPC ................... 370/252, 329, 331, 338
See application file for complete search history.

(56) References Cited

U.S. PATENT DOCUMENTS

2012/0289147 A1* 11/2012 Raleigh ............... H04L 67/2847
455/3.06
2013/0303114 A1* 11/2013 Ahmad ................... H04W 4/26
455/406

* cited by examiner

*Primary Examiner* — John Pezzlo
(74) *Attorney, Agent, or Firm* — Sterne, Kessler, Goldstein & Fox PLLC

(57) ABSTRACT

A low-power roaming mechanism is described. This low-power roaming mechanism is used by a portable electronic device when the portable electronic device enters a stand-by mode (sleep mode). During this stand-by mode, the portable electronic device allows a wireless interface to look for surrounding wireless networks with a configurable quota. This quota is allotted for roaming based on the usage or communication pattern of the portable electronic device. Once the allotted quota is completely used, the portable electronic device is blocked from performing roaming operations to prevent the portable electronic device from draining the battery.

20 Claims, 3 Drawing Sheets

ELECTRONIC DEVICE WITH LOW-POWER ROAMING

CROSS REFERENCE TO RELATED APPLICATION

This application claims priority under 35 U.S.C. §119(e) to U.S. Provisional Application Ser. No. 61/773,285, entitled "Supporting Low-Power Roaming," by Kapil Chhabra and Veerendra M. Boodannavar, filed on Mar. 6, 2013, the contents of which are herein incorporated by reference.

BACKGROUND

1. Field

The described embodiments relate to techniques for controlling power usage for a portable electronic device. More specifically, the described embodiments relate to techniques for controlling low-power Wi-Fi roaming in a portable electronic device.

2. Related Art

An important feature of many portable electronic devices, such as smartphones and tablet computers, is the ability to communicate packet data to enable activities such as sending and receiving emails or browsing the Internet. Often, portable electronic devices may communicate such packet data using either a wireless local area network (WLAN) connection (such as a Wi-Fi connection to a Wi-Fi network) or a cellular data connection to a cellular packet data network (such as a 3G or 4G network). However, communicating packet data to and from a portable electronic device consumes power, and because many portable electronic devices are powered by batteries, reducing power consumption while still enabling the communication of packet data may increase the length of time the portable electronic devices can be used before recharging the battery and, thus, may help improve the user experience.

To save power, it is preferable to use a Wi-Fi network instead of a cellular packet data network because the Wi-Fi circuitry within a portable electronic device typically consumes less power than the circuitry used to support the cellular packet data network. However, in order to maintain a Wi-Fi connection, a portable electronic device typically needs to perform periodic roaming operations to detect available access points (APs), and these roaming operations can consume a considerable amount of power.

SUMMARY

The disclosed embodiments relate to a low-power roaming mechanism. This low-power roaming mechanism is used by a portable electronic device when the portable electronic device enters a stand-by mode (which is sometimes referred to as a 'sleep mode'). During this stand-by mode, the portable electronic device allows the WLAN system on a chip (SoC) to look for surrounding WLAN networks with a configurable quota, such as: a quota for power consumption during roaming in a time interval, a quota for total roaming time during the time interval, or a quota for a number of instances of roaming scans during the time interval. This quota is allotted for roaming based on an observed usage or communication pattern. Once the allotted quota is completely used up, the portable electronic device is blocked from performing roaming operations to prevent the portable electronic device from draining its battery.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Figure 1:
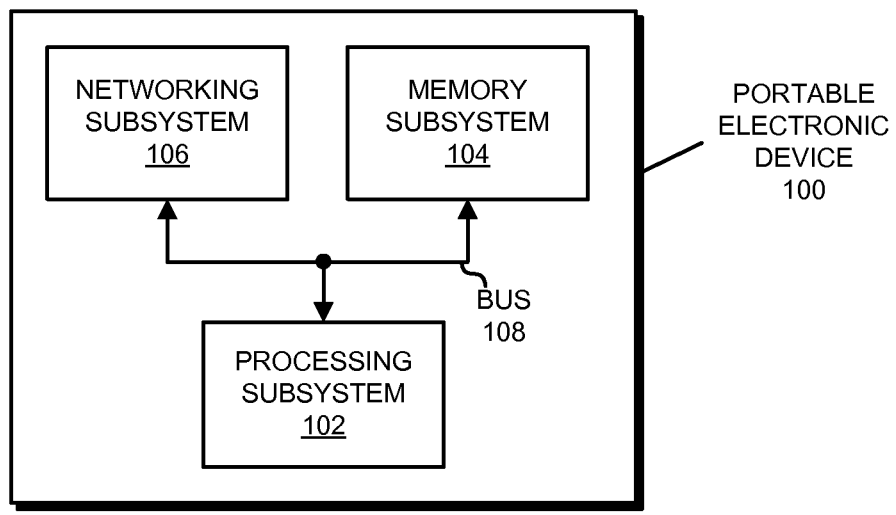
FIG. 1 presents a block diagram illustrating a portable electronic device in accordance with described embodiments.

The following description is presented to enable any person skilled in the art to make and use the present embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present embodiments. Thus, the present embodiments are not limited to the embodiments shown, but are to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium. Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Overview

Low-power associated sleep is a mode in which a portable electronic device maintains connectivity with an access point (AP) without using the Wi-Fi radio for any data exchanges. The portable electronic device enters this mode only when no user applications are subscribed to use the Wi-Fi network (i.e., when the user applications avoid communication via the Wi-Fi network). This mode makes the Wi-Fi interface in the portable electronic device readily available for time-critical application (like Siri™, a trademark of Apple Inc. of Cupertino, Calif.) to use as soon as a user activates the application. To maintain connectivity in an enterprise environment, it is desirable for the portable electronic device to roam smoothly among APs and the roaming should not cause an unnecessary power drain. During roaming, the portable electronic device can send probe-request packets and can look for associated probe-response packets and associated beacons.

To avoid excessive power drain in the enterprise environment, we propose a low-power associated sleep mode. During the low-power associated sleep mode, no applications are subscribed to use the network. If applications are subscribed to use the Wi-Fi interface during a standby mode (which is sometimes referred to as a 'wake-on-wireless' local area network or WoWLAN mode), then the portable electronic device can enter the low-power associated sleep mode. In the low-power associated sleep mode, the portable electronic device maintains a link to an AP by periodically sending gratuitous address resolution protocol (ARP) packets (e.g., every 90 seconds.) Also, if the signal strength associated with the Wi-Fi connection becomes low, the portable electronic device can perform roaming (i.e., can transmit probe requests) to identify the best APs to connect to. However, the signal-strength threshold for roaming in the low-power associated sleep mode may be less than the signal-strength threshold for roaming in a normal mode. For example, the threshold during the low-power associated sleep mode may be −80 dB instead of −70 dB in the normal mode.

In low-power associated sleep mode, the portable electronic device observes the usage or communication pattern of the portable electronic device and configures a 'quota' that the WLAN SoC can use for roaming. In particular, the quota may include: a quota for power consumption during roaming in a time interval, a quota for total roaming time during the time interval, and/or a quota for a number of instances of roaming scans during the time interval. For example, the WLAN SoC may: use up to 900 seconds for roaming in 24 hours (where a single roaming scan takes approximately 3s), consume up to 280 mW for roaming in 24 hours (where a single roaming scan consumes 3.5-4 mW), and/or perform 70 roaming scans (or probe-request/probe-response cycles) in 24 hours.

During the low-power associated sleep mode, the portable electronic device may determine a metric associated with the communication via the Wi-Fi network. For example, if the quota is based on roaming power consumption, the portable electronic device may evaluate the amount of power consumed by the WLAN SoC for roaming every 'X' hours (e.g., 2 hours). The portable electronic device may use these measurements to learn about the usage or communication pattern of the portable electronic device and can take actions based on that. In particular, the actions can include disconnecting from the Wi-Fi network until a user actively starts using the portable electronic device (such as by unlocking the portable electronic device). Once the roaming quota is completely used up by the WLAN SoC, the WLAN SoC may block the portable electronic device from roaming to prevent the battery from being drained. Then, the WLAN SoC may disconnect from the Wi-Fi network so there is no interaction with the AP and may disable the low-power associated sleep mode.

Note that the roaming quota can be thought of as a quota for roaming operations. This quota can be measured in a number of ways. For example, it can be measured in time (e.g., seconds spent performing roaming operations). If a power meter is available, the quota can be measured in used or consumed power. Alternatively, the quota can also be measured in number of probe requests/response cycles.

The above-described low-power associated sleep mode may ensure that, when the portable device is in the low-power associated sleep mode, and the user starts accessing an application like Siri™, the portable electronic device uses the Wi-Fi interface instead of the cellular-telephone interface.

Note that in the low-power associated sleep mode, a link or Wi-Fi connection with the AP is maintained without exchanging any data. Moreover, the applications may be responsive when they come up or power on. In addition, if the low-power associated sleep mode is used in an environment with lots of APs, the portable electronic device may roam smoothly among the APs.

We now describe the structure of the portable electronic device that uses the above-described low-power associated sleep mode.

Portable Electronic Device

FIG. 1 presents a block diagram illustrating portable electronic device 100 in accordance with described embodiments. Portable electronic device 100 includes processing subsystem 102, memory subsystem 104, and networking subsystem 106 all coupled together and communicating through bus 108.

Processing subsystem 102 includes one or more devices configured to perform computational operations. For example, processing subsystem 102 can include one or more microprocessors, application-specific integrated circuits (ASICs), microcontrollers, application processors, and/or programmable-logic devices.

Memory subsystem 104 includes one or more devices for storing data and/or instructions for processing subsystem 102, and networking subsystem 106. For example, memory subsystem 104 can include any type of computer-readable storage medium, such as dynamic random access memory (DRAM), static random access memory (SRAM), and/or other types of memory. In addition, memory subsystem 104 can include mechanisms for controlling access to the memory. In some embodiments, memory subsystem 104 includes a memory hierarchy that comprises one or more caches coupled to a memory in portable electronic device 100. In some of these embodiments, one or more of the caches is located in processing subsystem 102. Memory subsystem 104 may store one or more program modules or computer-program mechanisms with instructions for operations that implement the low-power associated sleep mode.

In some embodiments, memory subsystem 104 is coupled to one or more high-capacity mass-storage devices (not shown). For example, memory subsystem 104 can be coupled to a magnetic or optical drive, a solid-state drive, or another type of mass-storage device. In these embodiments, memory subsystem 104 can be used by portable electronic device 100 as fast-access storage for often-used data, while the mass-storage device is used to store less frequently used data.

Networking subsystem 106 includes one or more devices configured to couple to and communicate on a wired and/or wireless network (i.e., to perform network operations), including one or more cellular packet data and cellular-telephone networks (e.g., 3G/4G networks such as 1x, UMTS, LTE, etc.), and WLAN networks, including portions based on standards described in IEEE 802.11 (such as a Wi-Fi networking system). Networking subsystem 106 can include a Bluetooth networking system, which may include Bluetooth low energy (BLE) capabilities, a universal serial bus (USB) networking system, an Ethernet networking system, and/or another networking system. Networking subsystem 106 includes processors, controllers, radios/antennas, sockets/plugs, and/or other devices used for coupling to, communicating on, and handling data and events for each supported networking system. Networking subsystem 106 will be discussed in more detail below with respect to FIG. 2.

Processing subsystem 102, memory subsystem 104, and networking subsystem 106 are coupled together using bus 108. Bus 108 is an electrical, optical, or electro-optical connection that the subsystems can use to communicate commands and data among one another. Although only one bus 108 is shown for clarity, different embodiments can include a different number or configuration of electrical, optical, or electro-optical connections among the subsystems.

Although shown as separate subsystems in FIG. 1, in some embodiments, some or all of a given subsystem can be integrated into one or more of the other subsystems in portable electronic device 100. Although alternative embodiments can be configured in this way, for clarity we describe the subsystems separately.

Portable electronic device 100 can be (or can be included in) any device with at least one processing subsystem and one networking subsystem. For example, portable electronic device 100 can be (or can be included in): a laptop computer, a media player, a subnotebook/netbook, a tablet computer, a cellular phone, a personal digital assistant (PDA), a smartphone, a toy, a controller, or another device.

Portable electronic device 100 may also include one or more additional processing subsystems 102, memory subsystems 104, and/or networking subsystems 106. Additionally, one or more of the subsystems may not be present in portable electronic device 100. Furthermore, although we use specific subsystems to describe portable electronic device 100, in alternative embodiments, portable electronic device 100 may include one or more additional subsystems that are not shown in FIG. 1. For example, portable electronic device 100 may also include, without limitation: a data collection subsystem, an alarm subsystem, an audio subsystem, a display subsystem and/or an input/output (I/O) subsystem. Moreover, portable electronic device 100 may include a display subsystem which can include any type of display technology such as a light-emitting diode (LED), an organic light-emitting diode (OLED), a liquid crystal display (LCD) (such as thin film transistor (TFT), and/or other types of display technology). In addition, the display subsystem may include mechanisms for processing data, and/or other information for display and may also include an audio subsystem for producing sound. The display subsystem may also include touch screen technology for inputting information into portable electronic device 100 (thus, a display in portable electronic device 100 may include a multi-touch user interface). In some embodiments, one or more memory caches and/or processing systems or other hardware modules may be located in the display subsystem.

Networking Subsystem

Figure 2:
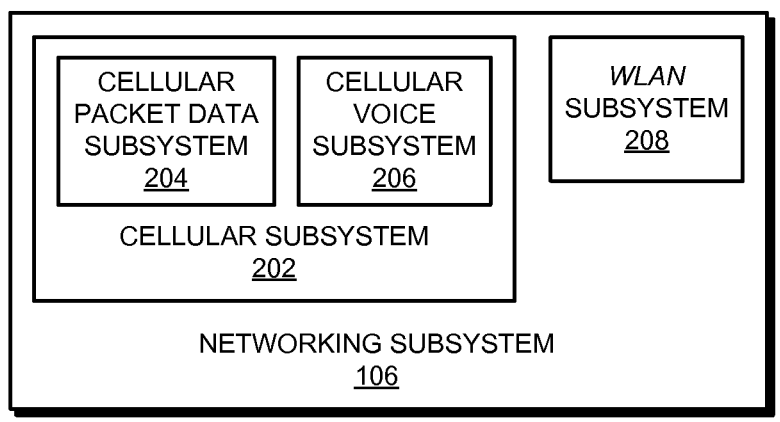
FIG. 2 presents a block diagram illustrating a networking subsystem in the portable electronic device of FIG. 1 that includes a cellular subsystem and a WLAN subsystem in accordance with described embodiments.

FIG. 2 presents a block diagram illustrating a networking subsystem in a portable electronic device that includes a cellular subsystem and a WLAN subsystem in accordance with described embodiments. Networking subsystem 106 includes WLAN subsystem 208 and cellular subsystem 202, which includes both cellular packet data subsystem 204 and cellular voice subsystem 206.

As discussed previously, networking subsystem 106 includes processors, controllers, radios/antennas, sockets/plugs, and/or other devices used for coupling to, communicating on, and handling data and events for each supported networking system, including WLAN and cellular voice information and packet data. For clarity, each subsystem within networking subsystem 106 is depicted separately. Note, however, that in some embodiments one or more of cellular subsystem 202 and WLAN subsystem 208 may share systems, hardware, software, and/or firmware. Additionally, for clarity cellular packet data subsystem 204 and cellular voice subsystem 206 are depicted separately, but in some embodiments they may share some hardware, systems, software, and/or firmware. For example, cellular packet data subsystem 204 and cellular voice subsystem 206 may share a common antenna and resource manager (e.g., in cellular subsystem 202). Also, note that WLAN subsystem 208 and cellular subsystem 202 may be implemented on different chips, and in some embodiments cellular subsystem 202 and WLAN subsystem 208 may each communicate through bus 108, but may not communicate directly with each other.

Operating System

Figure 3:
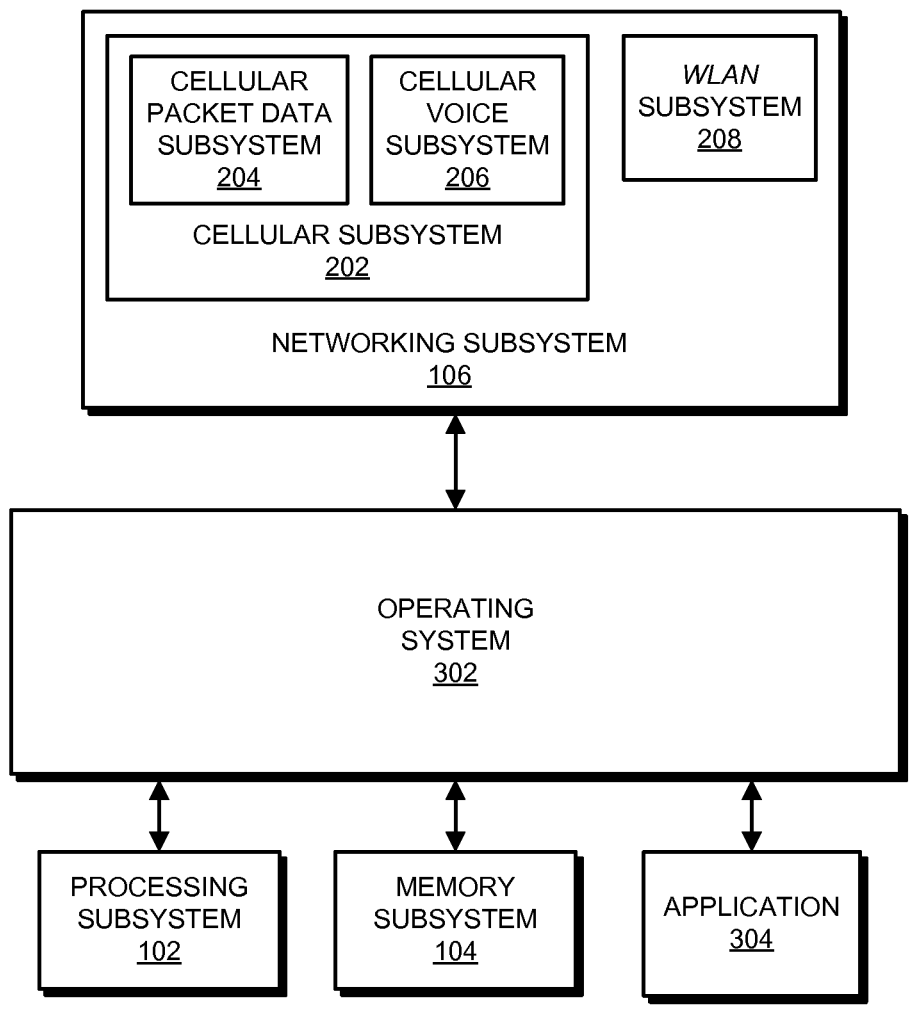
FIG. 3 presents a block diagram illustrating an operating system, application and subsystems of the portable electronic device of FIG. 1 in accordance with described embodiments.

FIG. 3 presents a block diagram illustrating operating system 302 in accordance with the described embodiments. In some embodiments, operating system 302 is stored (as program code) in memory subsystem 104 and executed by processing subsystem 102.

In general, operating system 302 serves as an intermediary between system hardware in portable electronic device 100 (e.g., subsystems 102-106) and applications executed by processing subsystem 102, such as application 304 (which can be, for example, an email application, a web browser, a text messaging application, a voice communication application, and/or a game application). For example, operating system 302 can be, but is not limited to, the iOS operating system or OS X operating system, both from Apple Inc. of Cupertino, Calif.; Windows Phone from Microsoft Corporation; Android from the Open Handset Alliance; the FreeBSD operating system from The FreeBSD Foundation of Boulder, Colo.; or another operating system. Operating systems and their general functions are known in the art and hence are not described in detail.

To manage the transfer of packets to and from application 304 and operating system 302 in portable electronic device 100 using an appropriate interface in networking subsystem 106, operating system 302 maintains one or more network protocol stacks (not shown) that each includes a number of logical layers. For example, the operating system can maintain a cellular protocol stack and/or an Internet protocol stack, which includes the link, Internet, transport, and application layers. As another example, the operating system can maintain a protocol stack based on the OSI model, which includes: the application, presentation, session, transport, network, data-link, and physical layers. At corresponding layers of the protocol stack, the operating system includes control mechanisms and data structures for performing the functions associated with the layer. The functions associated with each of the layers in the protocol stack are known in the art and hence are not described in detail.

Low-Power Associated Sleep Mode

Figure 4:
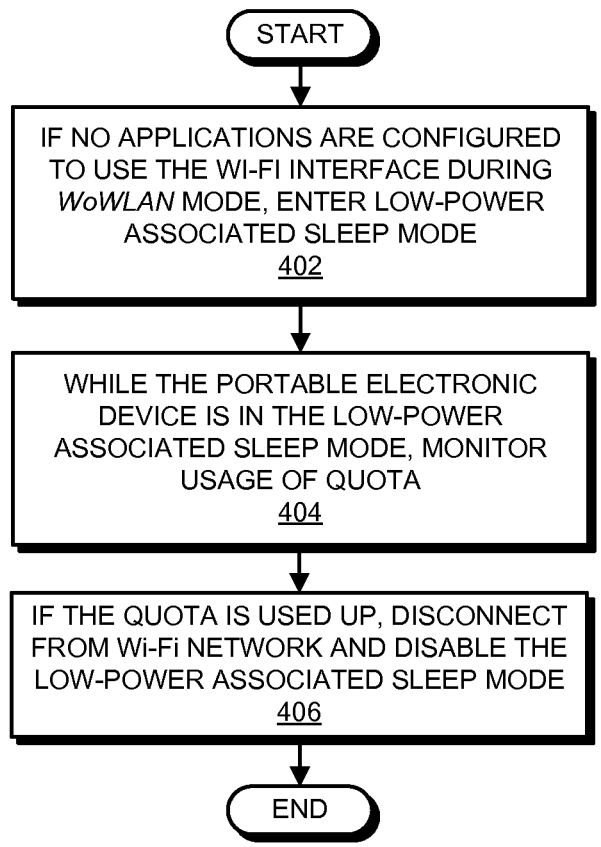
FIG. 4 presents a flow chart illustrating operations performed during a low-power associated sleep mode in accordance with described embodiments.

FIG. 4 presents a flow chart illustrating operations performed during the low-power associated sleep mode in accordance with described embodiments. First, if no applications are configured to use the Wi-Fi interface during low-power associated sleep mode, the portable electronic device enters the low-power associated sleep mode (operation 402). Next, while the portable electronic device is in the low-power associated sleep mode, the portable electronic device monitors usage of the quota (operation 404), i.e., measures or determines the metric. If the quota is used up, the portable electronic device disconnects from the Wi-Fi network and disables the low-power associated sleep mode (operation 406).

In some embodiments, there may be additional or fewer operations in FIG. 4. Moreover, the order of the operations may be changed, and/or two or more operations may be combined into a single operation.

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. An electronic device, comprising:
an antenna;
an interface circuit, coupled to the antenna, configured to communicate via a wireless network using a communication protocol;
a processor; and
memory, wherein the memory stores a program module, and wherein the program module is configured to be executed by the processor to facilitate access to the wireless network, the program module including:
instructions for comparing a metric associated with communication via the wireless network to a quota during a sleep mode of the electronic device in which the electronic device maintains a connection with an access point in the wireless network and avoids data exchanges via the wireless network; and
instructions for performing roaming operations to detect access points in the wireless network if the metric is less than the quota.

2. The electronic device of claim 1, wherein the communication protocol is other than a cellular-telephone communication protocol.

3. The electronic device of claim 1, wherein the communication protocol includes Wi-Fi.

4. The electronic device of claim 1, wherein the program module includes instructions for determining the quota based on an observed communication pattern of the electronic device with the wireless network.

5. The electronic device of claim 1, wherein the program module includes instructions for disconnecting the electronic device from the wireless network when the metric exceeds the quota to eliminate communication of the electronic device with the access points.

6. The electronic device of claim 1, wherein the memory includes an application configured to be executed by the processor; and
wherein, during the sleep mode, the application avoids communication via the wireless network.

7. The electronic device of claim 1, wherein the quota includes one of: a total time to perform the roaming operations during a time interval, a total power consumption associated with the roaming operations during the time interval, and a total number of instances of the roaming operations during the time interval.

8. The electronic device of claim 1, wherein the roaming operations include sending a probe-request packet and receiving a probe-response packet.

9. The electronic device of claim 1, wherein the program module includes instructions for detecting a signal strength associated with communication with the access point; and
wherein the roaming operations are performed if the signal strength is less than a threshold that is lower during the sleep mode than in a normal mode.

10. A computer-program product for use in conjunction with an electronic device, the computer-program product comprising a non-transitory computer-readable storage medium and a computer-program mechanism embedded therein, to facilitate access to a wireless network, the computer-program mechanism including:
instructions for detecting a signal strength associated with communication with an access point during a sleep mode of the electronic device in which the electronic device maintains a connection with the access point in the wireless network and avoids data exchanges via the wireless network;
instructions for comparing a metric associated with communication via the wireless network to a quota; and
instructions for performing roaming operations to detect access points in the wireless network if the metric is less than the quota and the signal strength is less than the threshold, wherein the threshold is lower during the sleep mode than in a normal mode.

11. The computer-program product of claim 10, wherein the communication protocol is other than a cellular-telephone communication protocol.

12. The computer-program product of claim 10, wherein the computer-program mechanism includes instructions for determining the quota based on an observed communication pattern of the electronic device with the wireless network.

13. The computer-program product of claim 10, wherein the computer-program mechanism includes instructions for disconnecting the electronic device from the wireless network when the metric exceeds the quota to eliminate communication of the electronic device with the access points.

14. The computer-program product of claim 10, wherein the quota includes one of: a total time to perform the roaming operations during a time interval, a total power consumption associated with the roaming operations during the time interval, and a total number of instances of the roaming operations during the time interval.

15. The computer-program product of claim 10, wherein the roaming operations include sending a probe-request packet and receiving a probe-response packet.

16. An electronic-device-implemented method for accessing a wireless network, wherein the method comprises:
determining a quota based on an observed communication pattern of the electronic device with a wireless network using a communication protocol;
comparing a metric associated with communication between the electronic device and the wireless network to the quota during a sleep mode of the electronic device in which the electronic device maintains a connection with an access point in the wireless network and avoids data exchanges via the wireless network; and
performing roaming operations to detect access points in the wireless network if the metric is less than the quota.

17. The method of claim 16, wherein the communication protocol is other than a cellular-telephone communication protocol.

18. The method of claim 16, wherein the method further includes disconnecting the electronic device from the wireless network when the metric exceeds the quota to eliminate communication of the electronic device with the access points.

19. The method of claim 16, wherein the quota includes one of: a total time to perform the roaming operations during a time interval, a total power consumption associated with the roaming operations during the time interval, and a total number of instances of the roaming operations during the time interval.

20. The method of claim 16, wherein the method further includes detecting a signal strength associated with communication with the access point; and
wherein the roaming operations are performed if the signal strength is less than a threshold that is lower during the sleep mode than in a normal mode.

* * * * *